Figure 1:
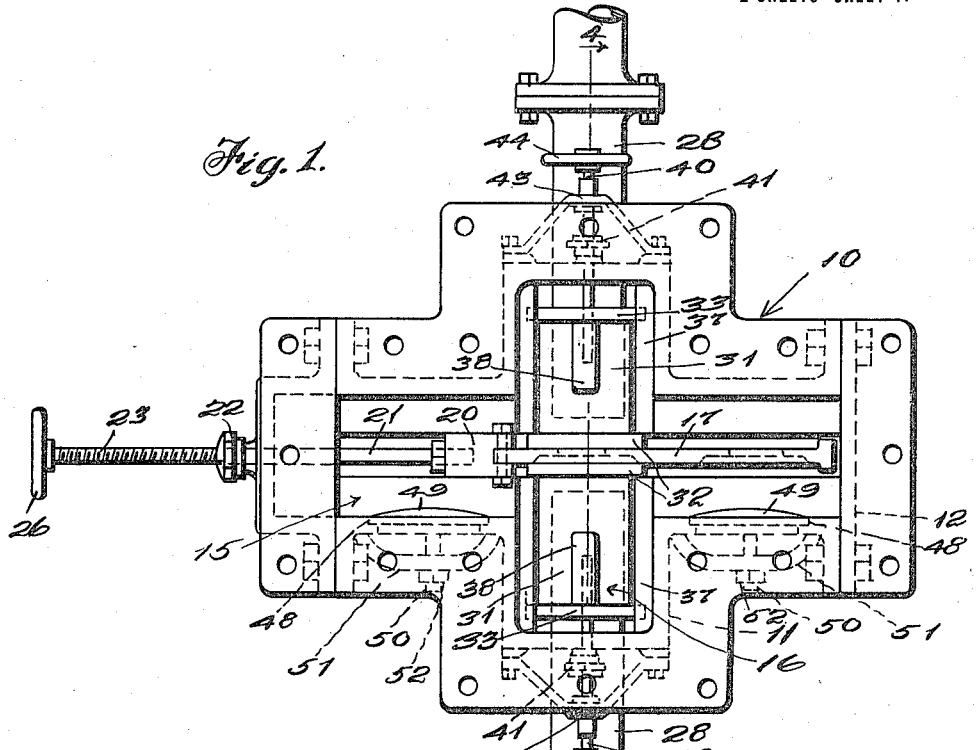

C. W. DUNCAN.
METER ORIFICE DISK VALVE.
APPLICATION FILED SEPT. 13, 1915.

1,168,490.

Patented Jan. 18, 1916.
2 SHEETS—SHEET 1.

Witnesses
Jno. T. Craig
C. R. Warden

Inventor
Charles W. Duncan,
By G. W. Earnshaw
Attorney

C. W. DUNCAN.
METER ORIFICE DISK VALVE.
APPLICATION FILED SEPT. 13, 1915.

1,168,490.

Patented Jan. 18, 1916.
2 SHEETS—SHEET 2.

Witnesses
Jno. T. Craig
C. R. Warden

Inventor
Charles W. Duncan,
By G. W. Carnahan
Attorney

UNITED STATES PATENT OFFICE.

CHARLES W. DUNCAN, OF JOPLIN, MISSOURI.

METER-ORIFICE-DISK VALVE.

1,168,490.  Specification of Letters Patent.  Patented Jan. 18, 1916.

Application filed September 13, 1915.  Serial No. 50,545.

*To all whom it may concern:*

Be it known that I, CHARLES W. DUNCAN, a citizen of the United States, residing at Joplin, in the county of Jasper and State of Missouri, have invented certain new and useful Improvements in Meter-Orifice-Disk Valves, of which the following is a specification.

My invention relates to improvements in gate valves, having meter orifice disk or disks, for controlling the volume of gas passing through the line or pipe.

It is well known, that the consumption of gas through a given line varies at different times, and this requires the supply to be correspondingly increased or diminished. This is ordinarily the most frequent cause of changing the meter orifice disks, but these orifice disks are often changed on account of their partial destruction or leakage, due to erosion.

As is well known, it is customary to employ meter orifice disks in gas lines or pipes for determining the volume of gas passing therethrough, at a given temperature and pressure. Heretofore, as far as I am aware, this meter orifice disk has been placed within an especially constructed flanged union with a cut off valve or gate on each side. To change the meter orifice disk, the gas must be cut off from the flanged union, which may be effected by closing the two cut off valves, and the line disconnected. The meter orifice disk is then taken out and another put in place, subsequently to which the line is again connected up, and the gas turned on by opening the cut off valves. It ordinarily requires two men to do this work, and on a very heavy line, additional men are required. The expense of labor, time consumed in making the change, testing connections, and the loss of gas which is often considerable, together with the great annoyance to users by having the gas cut off, frequently entailing a loss of considerable proportions, has created a demand for a gate valve, having meter orifice disk or disks that can be operated by a single man without cutting off the supply of gas to the users for any considerable length of time.

The invention further embodies other details, among which may be mentioned means for clamping the orifice disk carrying plate against movement and for effecting a gas tight joint between it and the ends of the pipe line.

An important object of the invention is to provide apparatus of the above mentioned character, which is simple in construction, inexpensive to manufacture, and which may be quickly and conveniently operated.

Other objects and advantages of the invention will be apparent during the course of the following description.

Figure 2:
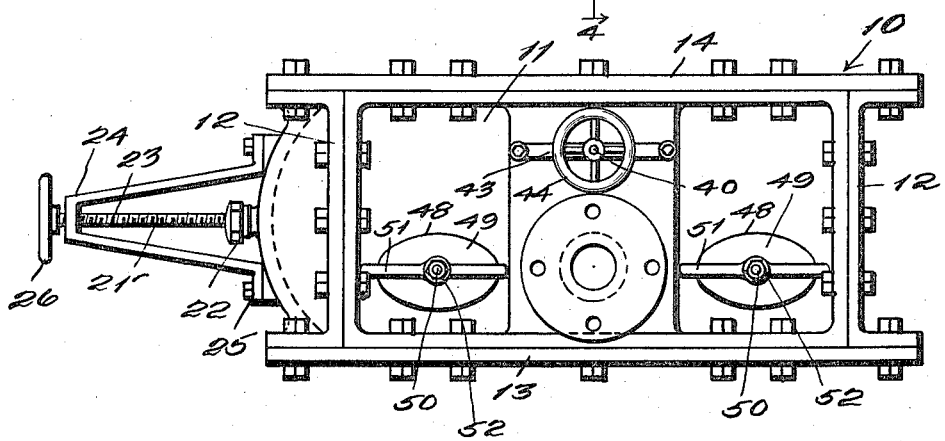
Figure 3:
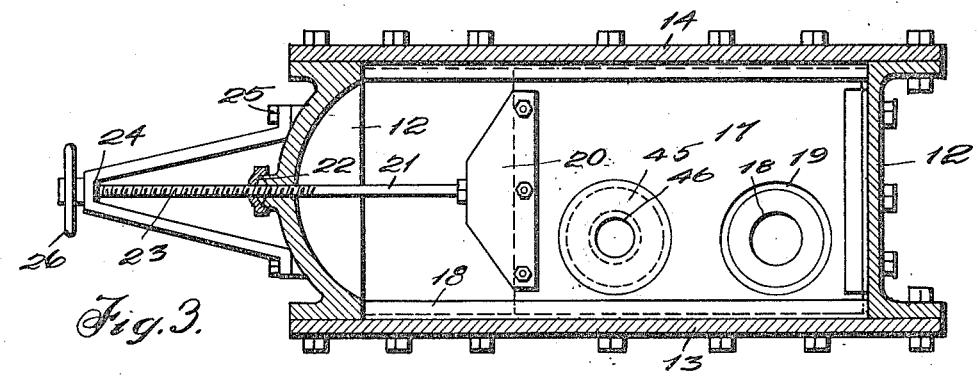
Figure 4:
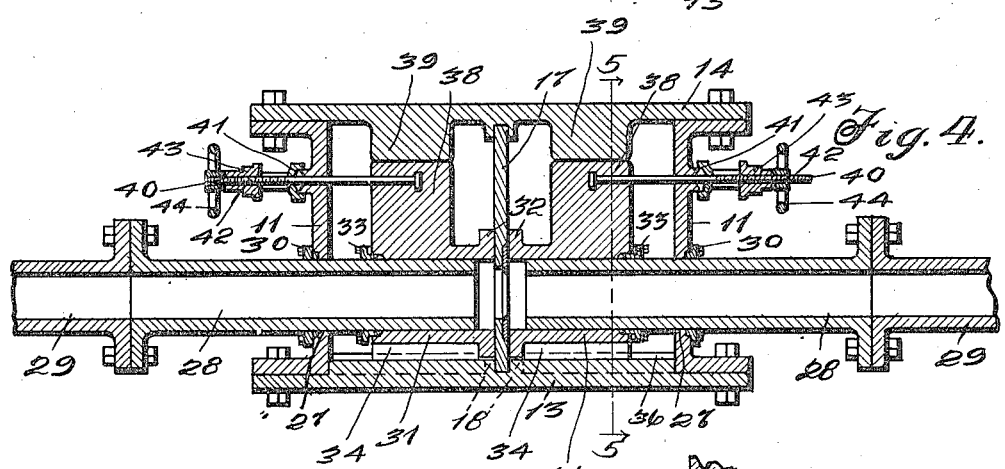
Figure 5:
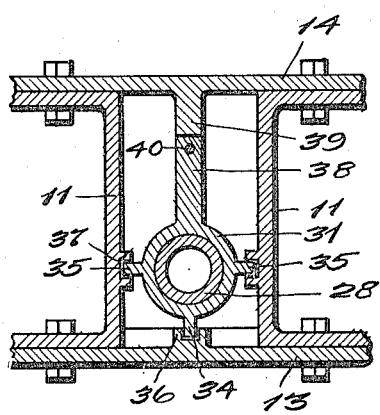
Figures 6, 7:
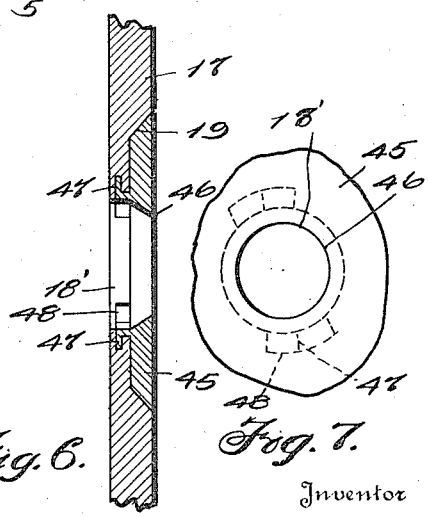

In the accompanying drawings forming a part of this specification and in which like numerals are employed to designate like parts throughout the same, Figure 1 is a plan view of apparatus embodying the invention, with the top plate removed, Fig. 2 is a side elevation of the same, Fig. 3 is a central vertical longitudinal sectional view through the apparatus, the orifice disks carrying plate being shown in elevation, Fig. 4 is a transverse sectional view taken on line 4—4 of Fig. 1, Fig. 5 is a transverse section taken on line 5—5 of Fig. 4, Fig. 6 is a detail section through one of the orifice disks, and, Fig. 7 is a side elevation of the same.

In the drawing, wherein for the purpose of illustration is shown a preferred embodiment of my invention, the numeral 10 designates an outer casing or shell, as a whole, embodying flanged sides 11, ends 12, bottom 13 and top 14, which are bolted or otherwise rigidly secured together. While this is the preferred construction of the outer casing or shell, it is to be understood that the invention is in no sense restricted to this specific type of casing. The casing, as more clearly shown in Fig. 1, is provided with a longitudinal chamber 15 and a transverse chamber 16.

Disposed to move or reciprocate longitudinally within the chamber 15 is an orifice disk carrying member or plate 17, shown more clearly in Figs. 1, 3 and 4. This plate is vertically arranged and has its edges operating within grooved guides or tracks 18. The member or plate 17 is provided with spaced orifices or openings 18', leading into recesses 19, formed upon one side of the member or plate, as more clearly shown in Fig. 7, for the purpose to be described.

Attached to one end of the member or plate 17 is a coupling-head 20, having swiveled connection with a rod 21, operating through a stuffing box 22, formed in the end 12, this end being preferably outwardly curved or bulged for receiving the coupling-head. The coupling-head 20 contacts with the end 12 to limit the movement of the member or plate 17 in that direction, and its movement in the opposite direction is limited when the opposite end thereof contacts with the other head 12. The rod 21 is provided with a screw-threaded portion 23, operating within a screw-threaded opening formed through the end of a V-shaped bracket 24, rigidly attached to the head 12, as shown at 25. The rod 21 is turned by a hand wheel 26, rigidly secured thereto. While the rod 21 and associated elements are the preferred means for moving the member or plate 17, it is to be understood that other means may be employed if desired.

As more clearly shown in Figs. 1 to 4, the sides 11 of the casing are provided with oppositely arranged openings 27 receiving tubular couplings or pipes 28, having suitable connection with the ends of a gas line or pipe 29, and forming in effect a continuation thereof. Suitable packing means 30 are preferably provided to prevent leakage of gas through the openings 27. The ends of the pipes 28 project into the casing 10 for a substantial distance, and are spaced, as clearly shown in Fig. 4, and tubular sleeves or members 31 are slidably mounted thereon, and have preferably flanged ends 32, projecting inwardly therebeyond for a substantial distance, when in the inner position, as clearly shown in Fig. 4. In order that there may be no leakage of gas between the pipes 28 and the openings of the sleeves 31, these sleeves are preferably equipped with stuffing boxes 33, as shown. Each sleeve 31, as clearly shown in Fig. 5, is provided with a depending vertical flange or rib 34 and horizontal flanges or ribs 35, operating respectively in groved guides or tracks 36 and 37. Each sleeve 31 also carries an upstanding web or flange 38, slidably contacting with a depending flange 39, formed upon the top 14.

The web 38 has swiveled connection with a rod 40, operating through a stuffing box 41. This rod has a screw-threaded portion 42, operating through a screw-threaded opening in a bracket 43, which is rigidly attached to the casing 10. The rod 40 is turned by a hand wheel 44 or other suitable means. From Fig. 4, it is obvious that by proper rotation of the hand wheels 44, the flanged ends 32 of the sleeves 31 may be moved inwardly for clamping contact with the member or plate 17, thus securely holding it against movement, without bending the plate or member, since the pressure may be equalized upon opposite sides thereof.

The numeral 45 designates meter orifice disks, adapted to be mounted within the recesses 19 and having tapered orifices or openings 46, adapted for registration with the opening or orifice 18 formed in the member or plate 17. The orifices 46 are so constructed that their larger ends are of substantially the same diameter as the openings 18 and the diameter of their smaller ends vary, as may be desired, and are determined by the extent of tapering of the orifice or openings. The edge of the disk 45 at the small end of the orifice 46 is sharpened to a knife edge. Each disk 45 is preferably provided with a pair of L-shaped lugs or keys 47, adapted to be inserted within L-shaped grooves 48, subsequent to which the disk is turned to bring the transverse portions of the lugs into the under-cut portions of the grooves 48, whereby the disk is locked to the plate 17. It is to be understood that any other suitable means may be employed to hold the disks 45 in position upon the plate 17.

In order that access may be readily had to the plate 17 for removing and replacing the disks 45, one side 11 of the casing 10 is provided with hand holes 48, disposed near its ends. These hand holes are normally covered by inwardly opening doors 49, adapted to form an air tight union when seated. Each door 49 carries an outwardly projecting bolt 50, extending through a curved bracket 51, engaging the exterior of the side 11. The bolt 50 carries a nut 52. It is obvious that by unscrewing the nut 52 the bolt 50 may be withdrawn from the opening in the bracket 51 and the door 49 moved inwardly to the open position.

The operation of the apparatus is as follows: Assuming that it is desired to reduce the volume of gas passing through the pipe or line 29, the wheels 44 are turned to move the flanged ends 32 of the sleeves 31 away from the member or plate 17, sufficiently to permit its movement. The wheel 26 is now turned in the direction to move the plate or member 17, to the right, for assuming the position shown in Fig. 3, the movement in this direction being positively limited when the end of the member 17 contacts with the adjacent end 12. The disk 45 having a smaller opening or orifice will now be arranged between the pipes 28 and in alinement therewith, thus regulating the amount of gas passing through the line or pipe 29. The wheels 44 are again turned to move the sleeves 31 inwardly so that their flanged ends 32 have clamping contact with the plate or member 17, holding it against accidental movement and forming a gas tight union therewith. When it is desired to increase the volume of gas passing through the line or pipe 29, the plate or member 17 is shifted to the left for bringing the disk 45 having the larger orifice 46, between the ends of the pipes 28, as is obvious. While one disk 45 is controlling the passage of gas through the pipe line, the other disk may be removed from the plate or member 17, without disturbing or cutting off the passage of gas through such pipe line. If it should be desired to change the other disk, the plate 17 is first shifted to bring it to the inoperative position, with the other disk operating to control the passage of gas through the line. The first named disk may now be removed and a new one substituted therefor. Each opening 18 in the plate 17 is preferably of the same diameter as the interior of the pipes 28 and when it is desired to have the volume of gas passing through the line raised to the maximum, the disk 45 which is in the outer or inoperative position, is removed, subsequent to which the plate 17 is shifted to bring the opening 18 with the disk removed, between the inner ends of the pipe 28.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, the combination with a casing having means for connection with a pipe, of a movable support arranged within the casing and having a plurality of openings, and a corresponding number of meter orifice disks removably mounted in the openings of the support for controlling the passage of fluid through the pipe, substantially as described.

2. In apparatus of the character described, the combination with a casing, of pipes extending into the casing in end to end relation with their ends spaced, a plate mounted to slide within the casing and having a plurality of openings adapted to be alternately brought into alinement with the ends of the pipes, a corresponding number of meter orifice disks removably mounted within the openings of the plate, and means to move the plate.

3. In apparatus of the character described, the combination with a casing, of pipes extending into the casing in end to end relation with their ends spaced, a plate mounted to slide within the casing between the inner ends of the pipes and provided with meter devices, sleeves mounted to slide upon the pipes to clamp opposite sides of the plate, means to move the sleeves, and means to move the plate.

4. In apparatus of the character described, the combination with a casing having spaced tubular members arranged therein, of a support mounted to move within the casing between the tubular members and having meter devices, sleeves mounted to slide upon the tubular members and contact with the support, means to move the sleeves, and means to move the support.

5. In apparatus of the character described, the combination with a casing having inlet and outlet means, of a plate arranged within the casing between the inlet and outlet means and provided with openings, meter orifice disks secured to the plate at the openings and having tapered openings decreasing in diameter away from the first named openings, and means to move the plate.

6. In apparatus of the character described, the combination with a casing having fluid inlet and outlet means and provided with hand holes arranged near its ends, doors for normally covering the hand holes, a movable support arranged within the casing between the inlet and outlet means, and meter orifice disks detachably secured to the movable support.

In testimony whereof I affix my signature in the presence of two witnesses.

CHARLES W. DUNCAN.

Witnesses:
HORACE MENETT,
CHAS. R. WORDEN.